United States Patent [19]

Cocco et al.

[11] Patent Number: 5,079,324

[45] Date of Patent: Jan. 7, 1992

[54] LIOH CATALYZED PREPARATION OF ALKOXYLATED DIORGANOPOLYSILOXANES

[75] Inventors: Roger Cocco, Saint-Symphorien d'Ozon; Michel Letoffe, Saint-Foy les Lyon; Georges Nielsen, Givors, all of France

[73] Assignee: Rhone-Poulenc Chimie, Courbevoie, France

[21] Appl. No.: 431,788

[22] Filed: Nov. 6, 1989

[30] Foreign Application Priority Data

Nov. 4, 1988 [FR] France .................................. 88 15312

[51] Int. Cl.$^5$ .............................................. C08G 77/06
[52] U.S. Cl. ........................................ 528/14; 528/34; 528/901
[58] Field of Search ............................ 528/14, 34, 901

[56] References Cited

U.S. PATENT DOCUMENTS 3,542,901 11/1970 Cooper et al. ........................ 528/10
4,111,890 9/1978 Getson et al. ........................ 260/37
4,467,063 8/1984 Lockhart .............................. 524/106

*Primary Examiner*—Melvyn I. Marquis
*Attorney, Agent, or Firm*—Burns, Doane Swecker & Mathis

[57] ABSTRACT

Functionalized diorganopolysiloxanes containing alkoxy endgroups, well adapted for the formulation of single-component cold-vulcanizable elastomer compositions therefrom, are prepared by reacting an α, ω-dihydroxydiorganopolysiloxane oil with a polyalkoxysilane in the presence of a catalytically effective amount of lithium hydroxide.

13 Claims, No Drawings

5,079,324

LIOH CATALYZED PREPARATION OF ALKOXYLATED DIORGANOPOLYSILOXANES

BACKGROUND OF THE INVENTION

1. Field of the Invention

The present invention relates to the preparation of diorganopolysiloxanes having alkoxy endgroups, hereinafter designated FP (functionalized polymers). This invention also relates to the use of such alkoxylated diorganopolysiloxanes as one of the essential constituents of single-component organopolysiloxane elastomer compositions which are stable in storage, in the absence of moisture, and which are cross-linked by atmospheric moisture at ambient temperature, namely, cold-vulcanizable elastomer compositions (CVE).

2. Description of the Prior Art

It is known to this art to prepare such FPs by reacting a di- or tri- or a tetraalkoxy silane with a diorganopolysiloxane oil containing a hydroxyl group bonded to the silicon atom at each end of its polymer chain, but it is necessary to employ a catalyst therefor. Many patents claim the use of specific catalysts for this functionalization reaction.

U.S. Pat. No. 3,542,901 describes an amine as a catalyst. This catalyst is effective, but the reaction is fairly slow (for example 15 to 30 min at 60° C. in the case of fairly reactive alkoxysilanes such as $Si(OCH_3)_4$ or $ViSi(OCH_3)_3$). With relatively unreactive alkoxysilanes, it is necessary to employ much longer times or else to obtain only incomplete reactions. It is also known to this art that the presence of residual silanols is generally detrimental to stability (see U.S. Pat. No. 4,489,191 and French Patent Applications Nos. 2,597,876 and 2,597,877). In addition, it is difficult to remove the amine completely, and this may have a detrimental effect on the storage stability of the composition; it can also cause the appearance of yellowish discolorations either during the storage of the compound or on the crosslinked product.

Thus, many other catalyst systems have been proposed for such purpose, including:

Potassium acetate: U.S. Pat. No. 3,504,051;
Various inorganic oxides: FR 1,495,011;
Organic titanium derivatives: U.S. Pat. No. 4,111,890;
Titanate plus amine: U.S. Pat. No. 3,647,846;
Alkoxyaluminum chelate: GB-A-2,144,758;
N,N′-Disubstituted hydroxylamine: FR-A-2,508,467;
Carboxylic acid plus amine: FR 2,604,713;
Carbamates: EP 0,210,402;
Organic compounds containing an oxime functional group: FR 2,597,875.

Certain of these catalysts are a little more active than the amines, but it is nevertheless necessary to heat the reaction mass to 60°–70° C. to obtain functionalization times of 5 to 10 minutes. In addition, these catalysts, or their residues, can have a detrimental influence on the storage stability, especially in the presence of curing catalysts, and on the properties of the crosslinked product, because it is difficult or impossible to remove them completely after reaction.

Another process for preparing functionalized oils (FPs) entails the use of mixed silanes which, in addition to the alkoxy groups, contain a hydrolyzable group such as an amido, amino, carbamate, oxime or similar group, optionally in the presence of a known functionalization catalyst and of a polyalkoxy silane.

Processes of this type are described, in particular, in U.S. Pat. Nos. 3,697,568 and 3,896,079, and in EP-A-69,256.

These processes are efficient, but require the use of costly mixed silanes. Furthermore, the organic products originating from the hydrolyzable groups after reaction can have a detrimental effect on the CVE composition (in this regard, compare pages 4 and 5 of French Patent FR-A-2,543,562).

SUMMARY OF THE INVENTION

Accordingly, a major object of the present invention is the provision of a highly efficient functionalization catalyst for producing linear diorganopolysiloxanes comprising at least one alkoxy group bonded to a silicon atom at each end of the polymer chains (hereinafter designated FP polymers or functionalized oils).

Another object of the present invention is the provision of a functionalization catalyst for preparing an FP at ambient temperature, especially when employing $CH_3Si(OCH_3)_3$, $CH_2=CH-Si(OCH_3)_3$ or $MeViSi(OCH_3)_2$ as a functionalizing agent (Me denoting the methyl group $-CH_3$ and Vi denoting the vinyl group $-CH=CH_2$).

Yet another object of this invention is the provision of a functionalization catalyst for preparing FPs at ambient temperature in a time less than 15 minutes, advantageously less than 10 minutes, preferably equal to or less than 5 minutes, especially when using one of the aforementioned crosslinking agents.

Another object of the present invention is the provision of an inexpensive catalyst, readily commercially available, and which can even be used in large amounts during the functionalization reaction.

Still another object of this invention is the provision of a functionalization catalyst which can easily be neutralized upon completion of the functionalization reaction, especially by using a silyl phosphate.

Another object of this invention is the provision of a functionalization catalyst which can be neutralized upon completion of a functionalization reaction without having to very quickly carry out such neutralization, for example, one hour after the functionalization reaction has been completed.

Another object of the present invention is the provision of a functionalization catalyst which, after its neutralization and optionally the devolatilization of the reaction mass upon completion of a functionalization reaction, permits the formulation, with the FP obtained (containing the product of the catalyst neutralization reaction) of compositions cold-vulcanizable into elastomers (CVE) which are stable in storage in the absence of moisture and which are crosslinked by atmospheric moisture at ambient temperature.

Such compositions exhibit the advantage of not requiring the use of compounds (scavengers) intended to remove the last trace amounts of silanols, for example those described in Patents Nos. EP 69,256, EP 104,179 and FR 2,543,562.

Briefly, the present invention features a process for the preparation of linear diorganopolysiloxanes containing at least one alkoxy group bonded to a silicon atom at each end of its polymer chain, such process comprising reacting at least one linear diorganopolysiloxane containing a hydroxyl group bonded to a silicon atom at each end of its polymer chain, with at least one polyalkoxysilane of the formula:

$$(R^4)_c(R^1)_a Si(OR^2)_{4-(a+c)} \quad (3)$$

in the presence of a catalytically effective amount of lithium hydroxide, and wherein formula (3), a is 0 or 1, or 2; c is 0 or 1, or 2; a+c is 0 or 1 or 2; $R^1$ is an aliphatic, cycloaliphatic or aromatic, substituted or unsubstituted, saturated or unsaturated $C_1$–$C_{13}$ monovalent hydrocarbon radical which may contain an epoxy, primary, secondary or tertiary amine or mercapto functional group; $R^2$ is an aliphatic radical having from 1 to 8 carbon atoms, in particular alkyl radicals, alkyl ether radicals, alkyl ester radicals, alkyl ketone radicals and alkylcyano radicals, or aralkyl radicals having from 7 to 13 carbon atoms, with the proviso that the $R^2$ radicals of the alkoxy groups of the silane of formula (3) may either be identical or different; and $R^4$ is an aliphatic, cycloaliphatic or aromatic, substituted or unsubstituted, saturated or unsaturated, $C_1$–$C_{13}$ monovalent hydrocarbon radical, with the proviso that $R^4$ may be identical to $R^1$.

This invention also features the use of linear diorganopolysiloxanes, especially those containing at least two alkoxy groups at each end of the polymer chain, and prepared according to the above process, for the formulation of single-component polysiloxane compositions which are stable in storage in the absence of moisture and which crosslink into elastomeric state in the presence of moisture.

DETAILED DESCRIPTION OF THE PREFERRED EMBODIMENTS OF THE INVENTION

More particularly according to the present invention, the diorganosiloxanes comprising at least one alkoxy group at each end of their polymer chains advantageously have the formula:

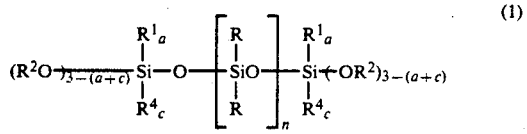
(1)

and the diorganopolysiloxane comprising a hydroxyl group at each end of its polymer chain advantageously has the formula:

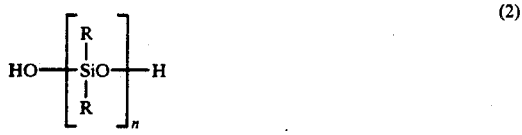
(2)

in which $R^1$, $R^2$ and $R^4$ are as defined above in the case of the silane of formula (3); the radicals R, which may be identical or different, are each a monovalent hydrocarbon radical having from 1 to 10 carbon atoms, optionally substituted by halogen atoms or cyano groups (the radicals R are preferably methyl, phenyl, vinyl and 3,3,3-trifluoropropyl radicals); a is 0, or 1, or 2; c is 0, or 1, or 2; a+c is 0, or 1, or 2; and n is a number of sufficient value to provide the polymers of formulae (1) and (2) with a viscosity of 25 to 1,000,000 mPa.s at 25° C., with the proviso that the polysiloxane of formula (1) may have an average formula in which the value of n is higher or lower than the value of n in the diorganopolysiloxane (2) which is reacted with the silane of formula (3).

Exemplary radicals R include:

(i) alkyl and haloalkyl radicals having from 1 to 10 carbon atoms, such as methyl, ethyl, propyl, isopropyl, butyl, pentyl, hexyl, 2-ethylhexyl, octyl, decyl, 3,3,3-trifluoropropyl, 4,4,4-trifluorobutyl or 3,3,4,4,4-pentafluorobutyl radicals;

(ii) cycloalkyl and halocycloalkyl radicals having from 1 to 10 carbon atoms, such as cyclopentyl, cyclohexyl, methylcyclohexyl, propylcyclohexyl, 2,3-difluorocyclobutyl or 3,4-difluoro-5-methylcycloheptyl radicals;

(iii) alkenyl radicals having from 2 to 4 carbon atoms, such as vinyl, allyl or 2-butenyl radicals;

(iv) mononuclear aryl and haloaryl radicals having from 6 to 10 carbon atoms, such as phenyl, tolyl, xylyl, chlorophenyl, dichlorophenyl or trichlorophenyl radicals; and (v) cyanoalkyl radicals, the alkyl moieties of which have from 2 to 3 carbon atoms, such as β-cyanoethyl and γ-cyanopropyl radicals.

Exemplary of the $R_2SiO$ units comprising the alpha,omega-dihydroxydiorganopolysiloxane of formula (2), particularly representative are:
$(CH_3)_2SiO$,
$CH_3(CH_2\!=\!CH)SiO$,
$CH_3(C_6H_5)SiO$,
$(C_6H_5)_2SiO$,
$CF_3CH_2CH_2(CH_3)SiO$,
$NC-CH_2CH_2(CH_3)SiO$,
$NC-CH(CH_3)CH_2(CH_2\!=\!CH)SiO$,
$NC-CH_2CH_2CH_2(C_6H_5)SiO$.

It will be appreciated that it is possible to employ as a polymer of formula (2) in the process according to the present invention, a mixture of alpha,omega-di(hydroxy)diorganopolysiloxanes which differ from each other in molecular weight and/or the nature of the groups bonded to the silicon atoms. It will also be appreciated that the polymer of formula (2) may optionally contain monoorganosiloxy $RSiO_{1.5}$ units and/or $SiO_2$ units, in a proportion not exceeding 2% relative to the number of $R_2SiO$ diorganosiloxy These alpha,omega-di(hydroxy)diorganopolysiloxanes are commercially available; moreover, they can easily be prepared according to techniques which are now well known to this art.

The following are particularly representative of the polyalkoxysilanes of the formula $(R^4)_c(R^1)_a Si(OR^2)_{4-(a+c)}$ which can be employed in the process according to the present invention:
$Si(OCH_3)_4$
$Si(OCH_2CH_3)_4$
$Si(OCH_2CH_2CH_3)_4$
$(CH_3O)_3SiCH_3$
$(C_2H_5O)_3SiCH_3$
$(CH_3O)_3SiCH\!=\!CH_2$
$(C_2H_5O)_3SiCH\!=\!CH_2$
$(CH_3O)_3SiCH_2\!-\!CH\!=\!CH_2$
$(CH_3O)_3Si[CH_2\!-\!(CH_3)C\!=\!CH_2]$
$(C_2H_5O)_3Si(OCH_3)$
$Si(OCH_2\!-\!CH_2\!-\!OCH_3)_4$
$CH_3Si(OCH_2\!-\!CH_2\!-\!OCH_3)_3$
$CH_2\!=\!CHSi(OCH_2CH_2OCH_3)_3$
$C_6H_5Si(OCH_3)_3$
$C_6H_5Si(OCH_2\!-\!CH_2\!-\!OCH_3)_3$

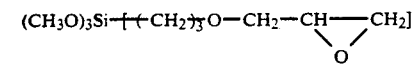

(CH$_3$O)$_3$Si—(CH$_2$)$_2$CH$_2$—Cl]
(CH$_3$O)$_3$Si—(CH$_2$)$_3$OOC—(CH$_3$)—C=CH$_2$]

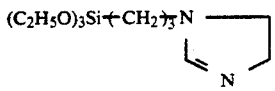

(C$_2$H$_5$O)$_3$Si—(CH$_2$)$_2$CH$_2$—Cl
(CH$_3$O)$_3$Si—(CH$_2$)$_3$NH$_2$
(C$_2$H$_5$O)$_3$Si—(CH$_2$)$_3$NH$_2$
(CH$_3$O)$_3$Si—(CH$_2$)$_3$NH—(CH$_2$)$_2$NH$_2$
(C$_2$H$_5$O)$_3$Si—(CH$_2$)$_3$NH—(CH$_2$)$_2$NH$_2$
(CH$_3$O)$_3$—Si(CH$_2$)$_3$SH
(CH$_3$) (CH$_2$=CH)Si(OCH$_3$)$_2$.

The most typically employed polyalkoxysilanes are: Si(OC$_2$H$_5$)$_4$, CH$_3$Si(OCH$_3$)$_3$, CH$_3$Si(OC$_2$H$_5$)$_3$, (C$_2$H$_5$O)$_3$Si(OCH$_3$), CH$_2$=CH—Si(OCH$_3$)$_3$, CH$_3$(CH$_2$=CH)Si(OCH$_3$)$_2$, CH$_2$=CH—Si(OC$_2$H$_5$)$_3$.

With regard to the lithium hydroxide catalyst, this is widely commercially available. Its formula is LiOH or LiOH·H$_2$O. It is preferably employed in solution in an alcohol such as, for example, methanol or ethanol.

In the process according to this invention, from 1 to 60 moles of polyalkoxysilane of formula (3) are generally employed per mole of silanol (≡SiOH) group of the polydiorganosiloxane of formula (2) containing a hydroxyl group bonded to a silicon atom at each polymer chain end, the excess of this alkoxysilane (3) being correspondingly greater as the molecular weight of the polydiorganopolysiloxane of formula (2) is increased.

By "catalytically effective amount" of lithium hydroxide is intended an amount such that the reaction rate is markedly improved and that the reaction temperature is as close as possible to the ambient temperature, especially when using CH$_3$Si(OCH$_3$)$_3$, CH$_2$=CH—Si(OCH$_3$)$_3$ or MeViSi(OCH$_3$)$_3$ as a functionalizing agent. From 0.001 to 0.5 moles of lithium hydroxide are generally employed relative to 1 mole of ≡SiOH silanol group of the polydiorganosiloxane of formula (2), it being appreciated that 0.5 moles of polydiorganosiloxane of formula (2) are required to have 1 mole of ≡SiOH.

The process according to the present invention is carried out in the absence of moisture, for example in a closed reactor equipped with a stirrer, to which vacuum is applied and the air removed is then replaced with an anhydrous gas, for example nitrogen.

The reactants and the catalyst are charged into the reactor and when the functionalization reaction is complete, the neutralization of the catalyst is carried out and, optionally, the reaction mass obtained is devolatilized to remove therefrom the alcohol formed during the functionalization reaction and the excess functionalizing agent (namely, the silane of formula (3)).

Many compounds can be used to neutralize the functionalization catalyst (lithium hydroxide), for example trichloroethyl phosphate or dimethylvinylsilyl acetate. It is preferred, however, to use a silyl phosphate such as, for example, those described in French Patent 2,410,004.

The devolatilization is carried out, for example, at an absolute pressure ranging from 133 to 13,332 pascals.

The present invention also features incorporating the diorganopolysiloxanes, especially those containing at least two alkoxy groups at each polymer chain end, prepared as described above, into single-component polysiloxane compositions which are stable in storage in the absence of moisture and which crosslink into elastomeric state in the presence of moisture.

These compositions are obtained by adding to 100 parts (by weight) of the functionalized polymer of formula (1), prepared according to the process of the present invention (containing the product of neutralization of lithium hydroxide):

(a) 0 to 250 parts or inorganic fillers;

(b) 0 to 20 parts, preferably 0 to 10 parts, of at least one additive selected from among aminoorganosilanes, aminoorganopolysiloxanes and guanidinoorganosilanes simultaneously bearing, per molecule:

(i) at least one C$_3$–C$_{15}$ organic group bonded by a SiC bond to the silicon atom and substituted by at least one amino radical or a guanidino radical; and (ii) at least one C$_1$–C$_5$ alkoxy radical or a C$_3$–C$_6$ alkoxyalkyleneoxy radical; and (c) an effective amount of a condensation catalyst.

By "effective amount" of a condensation catalyst is intended, for example, from 0.001 to 1 part by weight of at least one compound of a metal which is typically selected from among tin, titanium, zirconium and mixtures thereof.

The condensation catalyst may be a tin monocarboxylate or dicarboxylate, such as tin 2-ethylhexanoate, dibutyltin dilaurate or dibutyltin diacetate (see the text by Noll, *Chemistry and Technology of Silicones*, 2nd Edition, page 337, Academic Press (1968)).

The hexacoordinated chelates of tin of valency IV, such as those described in European Patent Application EP-A-147,323 and U.S. Pat. No. 4,517,337, are particularly suitable.

Also preferred are the condensation catalysts which are a mixture of a diorganotin bis($\beta$-diketonate) with an organic derivative of tin, also of valency IV, but devoid of any $\beta$-diketonato functional group, and containing at least one tin atom, each tin atom bearing two organic radicals bonded by a Sn—C bond, the other two valencies being satisfied by means of radicals selected from among organic or inorganic radicals bonded by an SnO or SnS bond, by halogen atoms, by hydroxyl groups and by oxygen atoms.

These organic derivatives of tin of valency IV which are devoid of $\beta$-diketonato functional groups may be, in particular, tin salts corresponding to the formulae:

A$_2$SnR$^6$$_2$
R$^6$SnO
AR$^6$$_2$SnOSnR$^6$$_2$A

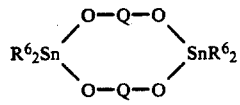

in which R$^6$ is a C$_1$–C$_{20}$ hydrocarbon radical, halogenated or otherwise; A is an organic or inorganic radical bonded to the tin atom via an Sn—O or Sn—S bond, a halogen atom; Q is a C$_2$–C$_{10}$ alkylene radical. A may be selected from among:

(i) monocarboxylate radicals of the formula $R^7COO$, wherein $R^7$ is a $C_1-C_{20}$ hydrocarbon radical, or halogenated such radicals;

(ii) dicarboxylate radicals of the formula

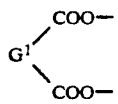

which are bonded to the same tin atom or to two tin atoms, resulting in the two formulae:

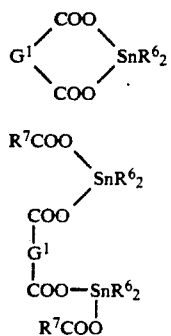

in which formulae $G^1$ is a divalent $C_1-C_{15}$ hydrocarbon radical and $R^7$ is as defined under (i);

(iii) dicarboxylate radicals of the formula $R^7OCOG^1\text{-}COO$, in which formula $R^7$ and $G^1$ are as defined under (i) and (ii), respectively.

The above tin salts are well known to the art and are described, in particular, in the abovementioned Noll text, U.S. Pat. Nos. 3,186,963 and 3,862,919, Belgian Patent 842,305 and British Patent GB-A-1,389,900.

The inorganic fillers are incorporated in a proportion of 0 to 250 parts, preferably of 5 to 200 parts, per 100 parts of FP of formula (1).

These fillers may be in the form of very finely divided materials whose mean particle diameter is less than 0.1 micrometer. These fillers include pyrogenic silicas and precipitated silicas; their BET specific surface area is generally higher than 40 m$^2$/g.

These fillers may also be in the form of more coarsely divided materials, with a mean particle diameter greater than 0.1 micrometer. Exemplary of such fillers are ground quartz, diatomaceous silicas, calcium carbonate, calcined clay, titanium dioxide of the rutile type, iron, zinc, chromium, zirconium and magnesium oxides, the various forms of alumina (hydrated or otherwise), boron nitride, lithopone, barium metaborate, barium sulfate and ballotini; their specific surface area is generally below 30 m$^2$/g.

These fillers may have been surface-modified by treatment with the various organosilicon compounds usually employed for this purpose. Thus, such organosilicon compounds may be organochlorosilanes, diorganocyclopolysiloxanes, hexaorganodisiloxanes, hexaorganodisilazanes or diorganocyclopolysiloxanes (French Patent FR-A-1,126,884, FR-A-1,136,885, FR-A-1,236,505; British Patent GB-A-1,024,234). In most cases, the treated fillers contain from 3 to 30% of their weight of organosilicon compounds.

The fillers may comprise a mixture of a number of types of fillers of different particle sizes; thus, for example, they may comprise 30 to 70% of finely divided silicas having a BET specific surface area greater than 40 m$^2$/g and of 70 to 30% of more coarsely divided silicas having a specific surface area lower than 30 m$^2$/g.

In order to improve, in particular, the adhesiveness of the CVEs, the compositions according to the invention may optionally contain from 0 to 20 parts, preferably from 1 to 15 parts of at least one additive selected from among aminoorganosilanes, aminoorganopolysiloxanes and guanidino-organosilanes simultaneously bearing, per molecule:

(i) at least one $C_3-C_{15}$ organic group bonded by an SiC bond to the silicon atom and substituted by at least one amino radical or a guanidino radical; and (ii) at least one $C_1-C_5$ alkoxy radical or a $C_3-C_6$ alkoxyalkylene radical.

These additives and the use thereof are described, in particular, in U.S. Pat. Nos. 2,754,311, 2,832,754, 2,930,809, 2,971,864, 3,341,563, 3,686,375 and 4,180,642.

Exemplary of such additives, particularly representative are the silanes of the formulae:

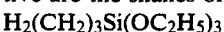
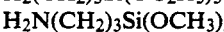
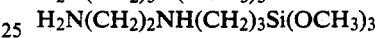

The adhesion promoters which are particularly suitable are the silanes of the formulae:

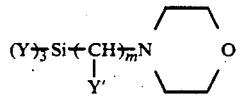

in which Y is an alkyl or alkoxy radical having from 1 to 4 carbon atoms, inclusive, at least two of the Y radicals being alkoxy radicals, the radicals Y', which may be identical or different, are each a hydrogen atom or an alkyl radical having from 1 to 3 carbon atoms, inclusive, and m is an integer ranging from 3 to 10, inclusive.

Representative such silanes include:

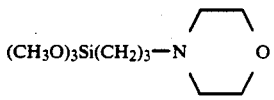

gamma-morpholinopropyltrimethoxysilane;

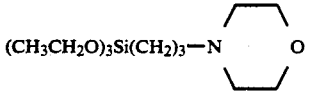

gamma-morpholinopropyltriethoxysilane.

These compounds and a process for the preparation thereof are described by John L. Speier, in *J. Org. Chem.*, vol. 36, No. 21, page 3120 (1971).

In order to further illustrate the present invention and the advantages thereof, the following specific examples are given, it being understood that same are intended only as illustrative and in nowise limitative.

EXAMPLE 1

100 g (0.143 moles) of an α,ω-dihydroxypolydimethylsiloxane containing 3.8% by weight of hydroxyl radicals were introduced into a reactor. This polysiloxane had the average formula:

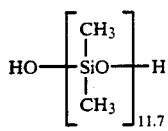

and a molecular weight of 696.6 g.

Dry nitrogen was introduced into this reactor and there were introduced, with stirring, at ambient temperature (23° C.), 75 g (0.55 moles) of methyltrimethoxysilane and 0.23 g (5.5 millimoles) of lithium hydroxide of formula LiOH.H₂O the latter being in solution in methanol (solution containing 10% by weight of lithium hydroxide in methanol).

After 5 minutes of reaction, the lithium hydroxide was neutralized by adding to the reaction mass obtained 3 g of the reaction residue of silyl phosphate which had a phosphoric acid equivalent content of 12.5% and which was prepared according to Example 2 of French Patent 2,410,004.

After devolatilization of the excess methyltrimethoxysilane and of the alcohol formed from the reaction mass (at 16×133.32 pascals), it was determined by $^1$H NMR and $^{29}$Si NMR that the resulting oil indeed had the structure:

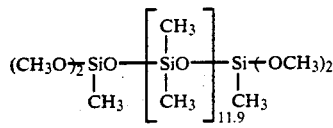

EXAMPLE 2

The procedure of Example 1 was repeated, with the following materials being introduced into the reactor:

(i) 100 g (0.769 millimoles) of α,ω-dihydroxypolydimethylsiloxane, having a viscosity of 130,000 mPa.s at 25° C., containing 770 ppm of hydroxyl groups;

(ii) 5 g (36.7 millimoles) of methyltrimethoxysilane;

(iii) 0.005 g (0.119 millimoles) of LiOH·H₂O in solution in methanol (10% concentration).

These materials were allowed to react for 3 minutes at 25° C. and 0.064 g of the neutralizing solution described in Example 1 was added.

The reaction mass obtained had a viscosity of 80,000 mPa.s at 25° C. This viscosity corresponded to that of the functionalized oil, decreased by the presence of the excess methyltrimethoxysilane introduced. It was determined by NMR and FTIR that no silanol groups remained.

EXAMPLE 3

The procedure of Example 2 was repeated, but without carrying out the neutralization of lithium hydroxide upon completion of the functionalization reaction.

Table I below reports the change in the viscosities over time (expressed in mPa.s and at 25° C.), after storage of the functionalized polydimethylsiloxanes (each of the reaction masses having been devolatilized at the end of reaction) according to Example 2 and according to this example.

TABLE I

| After storage for | Viscosity Example 2 | Viscosity Example 3 |
|---|---|---|
| 2 hours at 20° C. | 80,000 | 80,000 |
| 4 days at 20° C. | 75,000 | 10,000 |
| 10 days at 20° C. | 78,750 | 9,000 |
| 26 days at 20° C. | 80,000 | 1,000 |

This Table evidences that, to have a functionalized polydiorganopolysiloxane which is stable over time, it was necessary to neutralize the lithium hydroxide at the end of the functionalization reaction.

EXAMPLE 4

The procedure of Example 2 was repeated, but with the lithium hydroxide being replaced by 0.005 g potassium hydroxide (0.089 millimoles) as a 10% strength solution in methanol.

The reaction appeared to be very rapid, but when neutralization was carried out at the end of 2 minutes of reaction (using the same silyl phosphate as that employed in Example 2), the viscosity of the reaction mass was only 35,000 mpa.s. When the neutralization was carried out at the end of 30 minutes, the viscosity was then only 6,500 mPa.s. This test demonstrates, quite unexpectedly, that lithium hydroxide can be facilely employed to produce stable functionalized polymers, whereas potassium hydroxide was unsuitable. Furthermore, this result was obtained even when using a molar quantity of lithium hydroxide which was greater than the quantity of potassium hydroxide.

EXAMPLE 5

Table II below evidences that the functionalization reaction according to the process of the present invention, using lithium hydroxide as a catalyst in the quantities shown and operating with α,ω-dihydroxypolydimethylsiloxane according to Example 2 above, under the conditions of this Example 2, made it possible to produce functionalized polymers very rapidly (less than 10 minutes):

(a) at ambient temperature with the fairly reactive alkoxysilanes, such as ViSi(OCH₃)₃ and MeViSi(OCH₃)₂;

(b) at temperatures below 80° C. with relatively unreactive alkoxysilanes, such as Si(OC₂H₅)₄ Si[O—CH(CH₃)—CH₂OCH₃]₄.

TABLE II

| Alkoxy silane employed | g of LiOH.H₂O per 1,000 g of* | Temperature | Time required for complete functionalization |
|---|---|---|---|
| ViSi(OCH₃)₃ | 0.005 | 25° C. | 2 to 3 minutes |
| MeViSi(OCH₃)₂ | 0.005 | 25° C. | 2 to 3 minutes |
| Si(OC₂H₅)₄ | 0.04 | 75° C. | 5 minutes |
| Si[OCH(CH₃)—CH₂OCH₃]₄ | 0.04 | 65° C. | 5 minutes |

*α,ω-Dihydroxypolydimethylsiloxane according to Example 2 above.

EXAMPLE 6

The procedure of Example 2 was repeated, but using an α,ω-dihydroxypolydimethylsiloxane having a viscosity of 170,000 mPa.s and neutralizing the lithium hydroxide, not with a silyl phosphate, but with one of the following neutralizing agents:

TABLE III

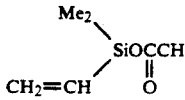

| Neutralizing agent | Quantity employed per 0.005 g of LiOH.H$_2$O | Initial viscosity in mPa · s | Viscosity after 1 month at 25° C. in mPa · s |
|---|---|---|---|
| CH$_3$COOH | 0.007 g | 108,000 | 110,000 |
| Me$_3$SiOCCH$_3$ (=O) | 0.025 g | 106,000 | 108,000 |
| Me$_2$(CH$_2$=CH)SiOCCH$_3$ (=O) | 0.017 g | 105,000 | 105,000 |

It was found that the functionalized oils obtained had a stable viscosity.

EXAMPLE 7

The following materials were charges into an apparatus equipped with a powerful stirrer and in the absence of moisture:

(i) 100 g of an α,ω-dihydroxypolydimethylsiloxane having a viscosity of 20,000 mPa.s;
(ii) 5 g of vinyltrimethoxysilane;
(iii) 0.005 g of LiOH.H$_2$O in solution at a concentration of 10% in methanol.

These were maintained for 5 min at 28° C. and 0.064 g of the neutralizing solution described in Example 1 was added.

The following materials were then added:
(iv) 3 g of (CH$_3$O)$_3$Si(CH$_2$)$_3$NHCH$_2$CH$_2$NH$_2$;
(v) 0.05 g of dibutyltin dilaurate;
(vi) 105 g of a calcium carbonate treated with stearic acid, having a mean diameter of 4 to 5 microns; and
(vii) 8 g of pyrogenic silica treated with octamethylcyclotetrasiloxane.

The product obtained was a nonflowing paste which was placed into closed tubes; some tubes were stored at 25° C., others were maintained at 70° C. for 10 days (accelerated aging test). The paste was then deposited in the form of sheets having a thickness of 1 to 2 mm on a nonadhesive substrate (Teflon), then permitted to crosslink for 7 days at 25° C. and at 60% relative humidity, and the properties were measured.

TABLE IV

| | Tube stored at 25° C. | Tube stored for 10 days at 70° C. |
|---|---|---|
| Shore A hardness | 45 | 40 |
| 100% modulus | 0.90 MPa* | 0.85 MPa |
| Tensile strength | 1.2 MPa | 1.1 MPa |
| Elongation at break | 225% | 240% |

*MPa: megapascals

It was found, furthermore, that the elastomers obtained by crosslinking with atmospheric moisture on various substrates generally exhibited an excellent adhesiveness to the latter.

The storage life in a closed tube at ambient temperature or even at 70° C. was good; it was therefore unnecessary to employ compounds intended to remove the last trace amounts of silanols, such as the scavengers described in Patents No. EP 69,256, EP 104,179 and FR 2,543,562.

The process of functionalization using lithium hydroxide was sufficiently effective to rapidly provide functionalized oils which were stable. These oils can be easily employed to prepare single-component silicone elastomer compositions which are crosslinked by atmospheric moisture and which are stable in a closed tube.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a linear diorganopolysiloxane containing at least one alkoxy group bonded to a silicon atom at each polymer chain end, comprising reacting, in a functionalization reaction, at least one linear diorganopolysiloxane containing a hydroxyl group bonded to a silicon atom at each polymer chain end with at least one polyalkoxysilane of the formula:

$$(R^4)_c(R^1)_a Si(OR^2)_{4-(a+c)} \quad (3)$$

in the presence of a catalytically effective amount of lithium hydroxide, and wherein such polyalkoxysilane of formula (3), a is 0, 1, 1, or 2; c is 0, 1, or 2; a+c is 0, 1 or 2; $R^1$ is an aliphatic, cycloaliphatic or aromatic, substituted or unsubstituted, $C_1$-$C_{13}$ monovalent hydrocarbon radical; the radicals $R^2$, which may be identical or different, are each an aliphatic radical having from 1 to 8 carbon atoms or an aralkyl radical having from 7 to 13 carbon atoms; and $R^4$ is an aliphatic, cycloaliphatic or aromatic, substituted or unsubstituted $C_1$-$C_{13}$ monovalent hydrocarbon radical, with the proviso that $R^4$ may be identical to $R^1$.

2. The process as defined by claim 1, said at least one linear diorganopolysiloxane containing at least one alkoxy group at each polymer chain end having the formula:

$$(R^2O)_{3-(a+c)}Si(R^1)_a(R^4)_c-O-\left[\begin{array}{c}R\\|\\SiO\\|\\R\end{array}\right]_n-Si(R^1)_a(R^4)_c(OR^2)_{3-(a+c)} \quad (1)$$

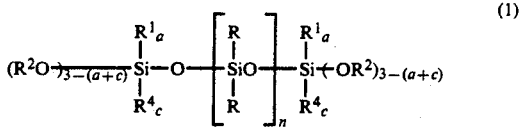

and said at least one linear diorganopolysiloxane containing a hydroxyl group at each polymer chain end having the formula:

$$HO-\left[\begin{array}{c}R\\|\\SiO\\|\\R\end{array}\right]_n-H \quad (2)$$

wherein the radicals R, which may be identical or different, are each a monovalent hydrocarbon radical having from 1 to 10 carbon atoms, or halogen or cyano substituted such radicals; and n is a number such as to impart a viscosity of 25 to 1,000 mPa.s at 25° C. to the diorganopolysiloxanes of formulae (1) and (2).

3. The process as defined by claim 2, wherein formulae (1) and (2), each radical R is a methyl, phenyl, vinyl or trifluoropropyl radical.

4. The process as defined by claim 1, said at least one polyalkoxysilane of formula (3) comprising methyltrimethoxysilane, vinyltrimethoxysilane, tetraethoxysilane, vinyltriethoxysilane or methylvinyldimethoxysilane.

5. The process as defined by claim 1, said lithium hydroxide comprising an alcoholic solution thereof.

6. The process as defined by claim 1, carried out in less than 10 minutes.

7. The process as defined by claim 1, carried out at ambient temperature.

8. The process as defined by claim 2, further comprising neutralizing said lithium hydroxide catalyst upon completion of the functionalization reaction between the diorganopolysiloxane containing a hydroxyl group at each polymer chain end of formula (2) and the diorganopolysiloxane of formula (3).

9. The process as defined by claim 8, comprising neutralizing said lithium hydroxide with a silyl phosphate.

10. The process as defined by claim 1, said lithium hydroxide catalyst comprising $LiOH \cdot H_2O$.

11. The process as defined by claim 1 wherein $R^1$ comprises an epoxy, primary, secondary or tertiary amine or mercapto functional group.

12. The process according to claim 1 wherein $R^1$ is saturated or unsaturated.

13. The process according to claim 1 wherein $R^4$ in saturated or unsaturated.

* * * * *